United States Patent
Buechner et al.

(10) Patent No.: US 11,981,115 B2
(45) Date of Patent: May 14, 2024

(54) USE OF MIXTURES OF WATER AND ESSENTIAL OIL FOR SEPARATING MULTILAYERED COMPOSITES FOR THE SEGREGATED RECYCLING OF POLYMER/METAL FILMS

(71) Applicant: Covestro Deutschland AG, Leverkusen (DE)

(72) Inventors: Joerg Buechner, Bergisch Gladbach (DE); Christoph Thiebes, Cologne (DE); Thomas Fait, Troisdorf (DE); Oliver Kirstein, Wuppertal (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 17/912,145

(22) PCT Filed: Mar. 19, 2021

(86) PCT No.: PCT/EP2021/057040
§ 371 (c)(1),
(2) Date: Sep. 16, 2022

(87) PCT Pub. No.: WO2021/191059
PCT Pub. Date: Sep. 30, 2021

(65) Prior Publication Data
US 2023/0135472 A1    May 4, 2023

(30) Foreign Application Priority Data

Mar. 23, 2020 (EP) .................................... 20164800

(51) Int. Cl.
*B32B 43/00* (2006.01)
*C09J 5/00* (2006.01)

(52) U.S. Cl.
CPC ............. *B32B 43/006* (2013.01); *C09J 5/00* (2013.01); *B32B 2309/12* (2013.01); *B32B 2310/0463* (2013.01); *C09J 2400/166* (2013.01); *C09J 2423/048* (2013.01); *C09J 2475/00* (2013.01); *Y10T 156/1111* (2015.01); *Y10T 156/1126* (2015.01); *Y10T 156/1153* (2015.01); *Y10T 156/1911* (2015.01)

(58) Field of Classification Search
CPC ............ B32B 43/006; Y10T 156/1111; Y10T 156/1126; Y10T 156/1153; Y10T 156/1911
See application file for complete search history.

(56) References Cited

U.S. PATENT DOCUMENTS

| 9,616,595 | B2 | 4/2017 | Fullana Font et al. |
| 10,533,282 | B2 | 1/2020 | Konishi et al. |
| 10,618,268 | B2 | 4/2020 | Kernbaum et al. |
| 2007/0228600 | A1 | 10/2007 | Bohnert et al. |
| 2016/0199230 | A1* | 7/2016 | Doshi ................ A61F 13/58 |
| | | | 156/219 |
| 2017/0080603 | A1 | 3/2017 | Lovis et al. |
| 2020/0016794 | A1 | 1/2020 | Konishi et al. |

FOREIGN PATENT DOCUMENTS

| DE | 4340087 A1 | 6/1995 |
| EP | 0543302 B1 | 10/1996 |
| JP | 2000331384 A | 11/2000 |
| JP | 2007284648 A | 11/2007 |
| WO | 2015000681 A1 | 1/2015 |
| WO | 2015149142 A1 | 10/2015 |

OTHER PUBLICATIONS

Messaoud, Chokri et al, "*Myrtus communis* L. infusions: the effect of infusion time on phytochemical composition, antioxidant, and antimicrobial activities", Sep. 30, 2012, XP055894105, https://pubmed.ncbi.nlm nih gov/22888790.

Choi, Jongwon et al, "Constituents of the Essential Oil of the *Cinnamomum cassia* Stem Bark and the Biological Properties", Nov. 30, 2001, XP055894101, URL:https://www.researchgate.net/publication/11659864_Constituents_of_the_Essential_Oil_of_the_Cinnamomum_cassia_Stem_Bark_and_the_Biological_Properties.

Neelam et al, "Phenylpropanoids and its derivatives: biological activities and its role in food, pharmaceutical and cosmetic industries", Critical Reviews in Food Science and Nutrition, Bd. 60, Nr. 16, Aug. 28, 2019, pp. 2655-2675, XP055894110, USA, ISSN: 1040-8398, DOI: 10.1080/10408398.2019.1653822, https://doi.org/10.1080/10408398.2019.1653822.

Scotti, Luca et al, "Analysis of biologically active oxyprenylated phenylpropanoids in Tea tree oil using selective solid-phase extraction with UHPLC-PDA detection", ScienceDirect, Journal of Pharmaceutical and Biomedical Analysis, vol. 154, May 30, 2018, XP055894127, https://www.sciencedirect.com/science/article/pii/S0731708518302784.

Hübner G., Frontal and counter pressure, RD-06-01930 (2008) in Böckler F., Dill B., Eisenbrand G., Faupel F., Fugmann B., Gamse T., Matissek R., Pohnert G., Rühling A., Schmidt S., Sprenger G., Rompp [Online], Stuttgart, Georg Thieme Verlag, [Jul. 2022] https://roempp.thieme.de/lexicon/RD-06-01930.

International Search Report, PCT/EP2021/057040, dated May 7, 2021, Authorized officer: Patrick Rüdiger.

\* cited by examiner

*Primary Examiner* — Philip C Tucker
*Assistant Examiner* — Nickolas R Harm
(74) *Attorney, Agent, or Firm* — The Webb Law Firm

(57) ABSTRACT

The invention relates to the use of mixtures of water and essential oils selected from the group consisting of phenols, phenylpropanoids and furanocoumarins, for separating multilayered composites for the segregated recycling of polymer/metal films.

15 Claims, No Drawings

USE OF MIXTURES OF WATER AND ESSENTIAL OIL FOR SEPARATING MULTILAYERED COMPOSITES FOR THE SEGREGATED RECYCLING OF POLYMER/METAL FILMS

CROSS-REFERENCE TO RELATED APPLICATIONS

This application is a national stage application under 35 U.S.C. 371 of PCT/EP2021/057040, filed Mar. 19, 2021, which claims the benefit of European application no. 20164800.3, filed Mar. 23, 2020, each of which is incorporated herein by reference.

DETAILED DESCRIPTION

Multilayer composites used, for example, for packaging foodstuffs consist of at least two film layers that are bonded to one another over their area. The films are, for example, polymer films produced from polyethylene, polypropylene, polyester, and polyamide. The polymer films can also be co-extruded polyolefin films having an inner layer of ethylene vinyl alcohol.

Multilayer composites may also optionally include a layer of aluminum film or of polypropylene or polyester films vapor-deposited with aluminum or silica. The multilayer composites may also include a paper layer. Multilayer composites generally contain a layer of printing ink, which can be applied frontally or in reverse (https://roempp.thieme.de/roempp4.0/do/data/RD-06-01930).

As a rule, 2-layer (duplex composites) or 3-layer (triplex composites) are used for food packaging. However, multilayer composites having more than three layers are also possible.

In many cases, the various layers are bonded to one another over their area by means of an adhesive polymer. This is generally done using 1-component or 2-component polyurethane adhesive polymers, which are applied as a solvent-free, solvent-containing or aqueous adhesive to at least one of the layers to be bonded before the layers to be bonded are bonded to one another. The weight of adhesive polymer applied between two layers to be bonded is between 0.5 g/m$^2$ and 5 g/m$^2$, depending on the type of adhesive. This does not include any solvent or water present in the adhesive. Adhesion promoters, based for example on polyurethane, may also be used in analogous manner. This is often the case for example with co-extruded polymers, such as the abovementioned co-extruded polyolefin films having an ethylene vinyl alcohol inner layer. The adhesive or adhesion promoter is not considered a layer.

The advantages of multilayer composites for packaging foodstuffs—compared to other types of packaging such as glass or metal packaging—are not only the low costs and low weight but also the small space requirement of the packaged foodstuff.

Multilayer composites for packaging foodstuffs have to meet high requirements. For example, the barrier provided by multilayer composites must be high enough to prevent the foodstuff from coming into contact with oxygen. The barrier is also necessary to protect flavors and vitamins in the foods. Occasionally, protective gases (e.g. nitrogen) are also introduced into the packaging. These protective gases must remain in the packaging throughout the shelf life of the foodstuff. The barrier effect of the packaging is thus necessary to ensure the foodstuff has the longest possible shelf life. The barrier property of a multilayer composite can be ensured through the selection of the film layers or combination thereof.

In addition to the barrier properties of multilayer composites, reliable bonding of the individual films to one another must also be ensured. This is particularly important for multilayer composites that are exposed to the steam sterilization process after the foodstuff has been packaged. Steam sterilization is carried out at temperatures of up to 134° C. over a period of up to 60 minutes. During this time, the film layers must not separate from one another. In order to meet this requirement, the adhesive polymer used must have high resistance. This requirement is essentially met only by crosslinked adhesive polymers.

Multilayer composites do however have the disadvantage that they can be separated into the individual film layers only with difficulty after the foodstuff has been consumed. Separation into the individual layers is however helpful in order that the polymers or the aluminum can be returned to material recycling as materials of a single type.

The German Packaging Act stipulates a recycling rate of 63% for plastic packaging from 2022. It is helpful when recycling results in plastics that are of the highest-possible quality and are as far as possible of a single type only. In order to permit sorting of the individual film layers into materials of a single type, the layers have to be separated from one other. The separation of the layers is however non-trivial, since the crosslinked adhesive polymers have only low solubility.

A way must therefore be found to weaken the layer of adhesive or layer of adhesion promoter between the film layers to such an extent that the layers can be separated from one another.

Special separation processes have now already been developed that can be used for individual film combinations or plastics.

For instance, patent EP 0 543 302 B1 discloses a process for separating aluminum film and polyethylene or polyester film under the action of fatty acids and in a closed container at 100° C. to 122° C.

A disadvantage of this invention is that it permits the separation only of selected film combinations. Use for the separation of all multilayer composites used for food packaging is not possible with this process.

WO 2015/000681 A1 describes a solvent-based plastics recycling process with which polymers can be recovered from plastic waste. The process is based on the use of thermal stabilizers in a mixture of paraffinic hydrocarbons. The polymer dissolved in the hydrocarbon mixture at elevated temperature precipitates on cooling. The polymer is separated off mechanically and the hydrocarbon mixture present in the polymer is removed by applying a vacuum, for example in a vented extruder. The thermal stabilizer prevents the dissolved polymer from undergoing polymer degradation. The recovered polymer contains 50-1000 ppm of the hydrocarbon mixture.

A disadvantage of this method is that the recovered polymer still contains residual amounts of the hydrocarbon used for the separation.

EP 2 668 226 B1 discloses a separating medium for multilayer systems that consists of a nanoscale dispersion comprising an organic component, an aqueous component, and a surfactant. The process is aimed at the recycling of photovoltaic modules.

US 2017/0080603 A1 describes a process for separating packaging materials, wherein the separating liquid comprises a carboxylic acid and a swelling agent, the latter being a hydrocarbon solvent such as toluene, xylene, ethylbenzene, cyclohexane or decalin, such as olefins, terpenes, ketones, ethers or esters.

There is therefore a need for a process for separating multilayer composites, in particular multilayer composites used for packaging foodstuffs. The process should weaken the layer of adhesive or layer of adhesion promoter between the film layers of the multilayer composites to such an extent that the multilayer composites can be separated into the individual layers.

The process should as far as possible be possible without the use of hazardous or highly flammable substances.

The object has been achieved by using a separating medium consisting of aqueous mixtures (emulsions) of at least one essential oil selected from the group consisting of phenols, phenylpropanoids, and furanocoumarins.

The present invention provides for the use of a separating medium comprising or consisting of at least one essential oil selected from the group consisting of phenols, phenylpropanoids and furanocoumarins, for separating at least two layers of a multilayer composite that are bonded to one another over their area by at least one adhesion promoter and/or at least one adhesive polymer, preferably at least one polyurethane-based adhesion promoter and/or at least one polyurethane-based adhesive polymer.

The present invention further provides a process for separating at least two layers of multilayer composites that are bonded to one another over their area by at least one adhesion promoter and/or at least one adhesive polymer, preferably at least one polyurethane-based adhesion promoter and/or at least one polyurethane-based adhesive polymer, characterized in that the multilayer composite is treated with a separating medium comprising or consisting of at least one essential oil selected from the group consisting of phenols, phenylpropanoids and furanocoumarins.

An adhesive is a non-metallic substance that is able to bond materials through surface adhesion (adhesion) and its internal strength (cohesion). It is therefore a process material that develops its mechanical strength only through a (physical or chemical) setting reaction during production and that, during the joining process of gluing (EN923:2015), is used for bonding different parts to be joined. Parts to be joined are understood as meaning two or more workpieces (having a geometrically defined shape or shapeless materials) that are permanently bonded to one another, such as the individual layers in multilayer composites. A joining process is accordingly a process that is used to enduringly bond workpieces to one another.

An adhesion promoter is in the context of this invention understood as meaning a polymer that—for example to improve adhesion—is introduced between two layers of a multilayer composite in a coextrusion process. Typical polymer classes used as adhesion promoters are: poly(ethyl-vinyl alcohol) polymers, modified polyolefins, polyesters, and polyurethanes. Particular preference is given to polyesters and polyurethanes, particular preference to polyurethanes, and very particular preference to polyester polyurethanes.

Polyurethane-based adhesion promoters and/or polyurethane-based adhesive polymers are in the context of this invention understood as meaning polymers that, after setting, have at least one structural feature in the polymer chain that is formed by reaction of an isocyanate group with an isocyanate-reactive compound. Examples of structural features that are produced by the reaction of isocyanate groups with isocyanate-reactive compounds are urethane, allophanate, biuret, and urea groups.

In the rest of the description, adhesion promoter refers both to the state before and state after setting (process by which an adhesive acquires its cohesive strength and the adhesive bond develops its physical and chemical properties).

The separating medium used may be the essential oil or mixture of essential oils itself, a single-phase mixture of the essential oil or mixture of essential oils with other substances, or a multiphase composition comprising the essential oil, for example an aqueous emulsion of the essential oil or mixture of essential oils.

The separating medium preferably consists of an aqueous emulsion of the at least one essential oil.

In a further preferred embodiment, the separating medium comprises an aqueous emulsion of the at least one essential oil. In this embodiment, the separating medium preferably does not contain any carboxylic acid.

Preference is given to using in the process an aqueous emulsion comprising >0.1% by volume, particularly preferably ≥0.5% by volume, very particularly preferably ≥1% by volume, even more preferably ≥10% by volume, of the at least one essential oil, based on the volume of water used.

Examples of essential oils from the group of phenols, phenylpropanoids and furanocoumarins include carveol, carvacrol, thymol, apiol, trans-methyl cinnamate, cis- and trans-anethole, dillapiole, estragole, eugenol, and coriandrin.

The essential oils may be of natural origin, i.e. obtained from plants or plant parts, or they may be produced synthetically.

The essential oil may also be chemically modified by oxidation, esterification or alkylation.

Among the groups of substances mentioned above, phenylpropanoids are particularly suitable for use in the process of the invention.

Very particularly suitable is the compound eugenol.

The abovementioned essential oils from the group of phenols, phenylpropanoids, and furanocoumarins or mixtures of these oils may also be used in the process of the invention in admixture with essential oils from the substance groups of acyclic and cyclic mono- and sesquiterpenes. Examples of acyclic and cyclic mono- and sesquiterpenes are ocimene, myrcene, limonene, α-terpinene, phellandrene, α-pinene, camphene, linalool, geraniol, menthol, sabinol, borneol, neral, citronellal, carvone, menthone, camphor, fenchone, menthofuran, eucalyptol, anethofuran, geranyl acetate, linalyl acetate, bornyl acetate, isobornyl acetate, farnesol, farnesene, α-bisabolol, α-caryophyllene, chamazulene and β-caryophyllene. Preference is however given to using essential oils and mixtures of essential oils selected exclusively from the group of phenols, phenylpropanoids, and furanocoumarins.

In a preferred embodiment, the aqueous emulsion contains ≥0.5% by volume, preferably ≥0.9% by volume, of a mixture of essential oils, based on the volume of water used, the proportion by volume of eugenol in the mixture of essential oils being at least (≥) ⅓.

The effectiveness of the process may be boosted by adding surface-active substances, e.g. surfactants, emulsifiers to the mixture of water and essential oil(s).

A multilayer composite consists for the purposes of the invention of at least two layers that are bonded to one another over their area and that can consist of the same material or different materials.

The layers are polymer layers, preferably produced from polyethylene, polypropylene, polyester or polyamide. These may be co-extruded polymer layers, for example polyolefin films having an inner layer of ethylene vinyl alcohol. The surfaces of the polymer layers may be treated, i.e. Vapor-deposited, for example, with aluminum or SiOx or printed with printing ink. In this case, the polymer layer, including the layer produced by the surface treatment, is to be regarded as a single layer of the multilayer composite.

On the other hand, an aluminum film bonded over its area to a layer of the composite by means of an adhesion promoter or an adhesive polymer is regarded as a separate layer. This applies also to an aluminum layer that is first vapor-deposited onto a carrier and then bonded over its area to a layer of the composite by means of a transfer coating using an adhesion promoter or an adhesive polymer. A layer of the composite may also be a layer of paper or cardboard, or a layer containing plant fibers.

Polyurethane-based adhesion promoters or adhesive polymers with which the layers can be bonded over their area are described in detail in the prior art, for example in Manufacturing Flexible Packaging, Thomas Dunn, ISBN 978-0-323-264-36-5, Ulrich Meier Westhues; Polyurethane, Lacke, Kleb- and Dichtstoffe [Polyurethanes, coatings, adhesives, and sealants], ISBN 978-3-86630-896-1. This list is not to be interpreted restrictively. It is course possible to separate, using the process of the invention, also multilayer composites in which layers are bonded with polyurethane-based adhesion promoters or adhesive polymers that are not described in the documents mentioned.

DESCRIPTION OF THE PROCESS

The multilayer composite is optionally comminuted and treated with the separating medium comprising at least one essential oil selected from the group consisting of phenols, phenylpropanoids, and furanocoumarins by refluxing. The treatment may also be carried out at a pressure >standard pressure (1013 mPas), for example in an autoclave, and therefore at a higher boiling temperature. The dependence of the boiling point of a substance on the ambient pressure is well known to those skilled in the art. The temperature to be set, which depends on the pressure during treatment, is determined by those skilled in the art on the basis of their specialist knowledge.

During the treatment, the layer of adhesive or layer of adhesion promoter is weakened to such an extent that the multilayer composite can be separated into its individual layers by slight mechanical stress (for example shear stress).

To increase the effectiveness of the process, the multilayer composites are comminuted, for example by means of a cutting mill or a shredder. A multilayer composite has 2 surfaces, referred to as the cover surfaces, that are formed by the top and bottom layers and face away from the other layers of the multilayer composite, and a plurality of lateral surfaces, each corresponding to a section through the layers from the top to the bottom cover surface. The comminution of the multilayer composite results in an increase in the total surface formed by the lateral surfaces and thus also in the contact surface area of the separating medium with the adhesive polymer or adhesion promoter. The penetration of the separating medium into the layer of adhesive or layer of adhesion promoter is thus improved and the weakening of the layer of adhesive or layer of adhesion promoter can be achieved more swiftly.

The term "multilayer particles" is in the context of the present invention understood as meaning all parts produced from the multilayer composite through mechanical comminution, for example by cutting, shredding, tearing, etc.

The multilayer composite is comminuted such that the multilayer particles extend along the axes that run parallel to the cover surfaces of the multilayer particles by an average, for all multilayer particles, of preferably ≤400 mm$^2$ and more preferably ≤100 mm$^2$.

The expression "cover surfaces of a multilayer particle" is in the context of the present invention understood as meaning the surfaces of the top layer and bottom layer of the multilayer particle that both face away from the other layers of the multilayer particle.

The weakening of the layer of adhesive or layer of adhesion promoter is greater the longer the reflux treatment is carried out.

Depending on the concentration of the essential oil(s) in the aqueous emulsion and with a multilayer particle size as indicated above, the duration of the reflux treatment should preferably, or particularly preferably, be as follows:

≥0.5% by volume (based on the volume of water used): preferably more than 2 hours, particularly preferably at least 3 hours, very particularly preferably at least 4 hours, ≥1% by volume (based on the volume of water used): preferably at least 1.5 hours, particularly preferably at least 2 hours, very particularly preferably at least 3 hours, ≥10% by volume (based on the volume of water used): preferably at least 0.5 hours, particularly preferably at least 1 hour, very particularly preferably at least 2 hours, Before or after the comminution—and before the introduction of the multilayer particles into the separating medium—the multilayer composites or multilayer particles may be freed (cleaned) of adhering foodstuffs, etc. by a washing process. Aqueous solutions of, for example, surfactants, surface-active substances, acids or bases may be used therefor.

The separating medium may be heated to boiling temperature before or after the multilayer particles are introduced into the separating medium. The rate at which the multilayer particles separate into the individual layers may be accelerated by generating laminar or turbulent movement/flow in the separating medium.

The method is possible in a batch process or in a continuous process.

After treatment with the separating medium, the particles of the individual layers are separated from the separating medium by sieving, by filtration or by centrifugation. Layers still adhering to one another, i.e. layers that have not been completely detached from one another after treatment with the separating medium, can be separated from one another mechanically, for example by a pair of shearing rollers.

The separation of the particles into polymer classes of a single type and into aluminum particles, i.e. the separation according to particle material, can be carried out by known separation processes such as flotation, suspension or settling or by eddy current separation (separation of aluminum).

Printing inks can subsequently be removed from the polymer particles or aluminum particles by suitable washing processes. Reference should be made here to patent EP 2 832 459 A1 by way of example.

Adhering essential oil can either be washed off the polymer particles or aluminum particles by a washing process involving suitable surfactants, or can be removed from the polymer particles or aluminum particles by steam distillation.

After drying the polymer particles or aluminum particles that have been separated, cleaned and optionally freed from printing inks, these can be returned to the material recycling.

The volume fraction of essential oil in the separating medium can be determined during treatment of the multilayer composites in a batch process or in a continuous process. If necessary, the volume fraction in the separating medium may be maintained or topped up by adding essential oil.

During the treatment of the multilayer composites with the separating medium, polyurethane polymer will migrate into the separating medium. The polyurethane polymer may here migrate into the separating medium either in the form of undissolved, for example swollen, polymer particles or in dissolved form. Polyurethane particles can be separated from the separating medium by suitable methods, e.g. filtration or centrifugation.

EXAMPLES

Multilayer Composites:
Multilayer Composite 1: Polyester/Printing Ink//Aluminum//Polyethylene
  Packaging Eduscho Espresso (label: 29.06.2020 L9031 H57/2 08:56)
Multilayer Composite 2: Polyester/Printing Ink//Polyethylene
  Josera "Minivita" dry dog food
  Polyester and printing ink are together regarded as a single layer.
  // means adhesive layer based on a polyurethane adhesive.

Essential Oils:
  Source of supply for all of the oils mentioned below: Sigma-Aldrich, Munich
    Eugenol (CAS #97-53-0)—phenylpropanoid
    trans-Anethole (CAS #104-46-1) (phenylpropanoid)
    trans-Methyl cinnamate (CAS #: 1754-62-7) (phenylpropanoid derivative)
    Linalool (CAS #78-70-6)—monoterpene
    Citronellal (CAS #106-23-0)—monoterpene Determination of Composite Strength:
  The composite adhesion of the film layers is determined using the Zwick 5 kN Allround table-top testing machine in accordance with DIN 55533-5 in a 180° peel test. The reported values are the average values from five individual measurements.

Experiment 1: Visual Inspection of the Separation (Table 1)

The multilayer composites are cut with scissors into squares approx. 1 cm$^2$ in size. 10 pieces of multilayer composite of approx. 1 cm$^2$ are placed in a stirred apparatus consisting of a 250 ml multinecked flask with stirrer, thermometer, and reflux condenser and heated with an oil bath.

The stirred apparatus is filled with 100 ml of water, or with 100 ml of water containing 0.1 ml, 0.5 ml, 1 ml, or 10 ml of essential oil, and heated to boiling temperature. The flask contents are boiled under reflux at approx. 100° C. for up to 20 h. The multilayer composites are visually checked for separation at intervals of 1 hour.

TABLE 1

| | Multilayer composite 1 | | | | | | | |
|---|---|---|---|---|---|---|---|---|
| | 1 h | | 2 h | | 3 h | | 20 h | |
| | Al//PET | Al//PE | Al//PET | Al//PE | Al//PET | Al//PE | Al//PET | Al//PE |
| 100 ml water | − | − | − | − | − | − | − | − |
| +0.1% eugenol | − | − | − | − | − | − | − | − |
| +0.5% eugenol | − | − | − | − | −+ | −+ | 0 | 0 |
| +1% eugenol | −+ | −+ | + | + | ++ | ++ | 0 | 0 |
| +10% eugenol | + | + | ++ | ++ | 0 | 0 | 0 | 0 |
| +1% trans-anethole | 0 | 0 | 0 | 0 | − | ++ | 0 | 0 |
| +1% trans-methyl cinnamate | 0 | 0 | 0 | 0 | ++ | + | 0 | 0 |
| +1% linalool | 0 | 0 | 0 | 0 | − | −+ | 0 | 0 |
| 1% citronellal | 0 | 0 | 0 | 0 | − | + | 0 | 0 |
| +0.33% eugenol + 0.33% trans-anethole + 0.33% trans-methyl cinnamate | 0 | 0 | 0 | 0 | + | ++ | 0 | 0 |
| +1% eugenol + 1% trans-anethole + 1% methyl trans-cinnamate | 0 | 0 | 0 | 0 | ++ | ++ | 0 | 0 |

− no change in composite adhesion/no visible separating effect
−+: separation of layers at the cut edges
+: delamination already visible over a wide area
++: complete delamination
0: not tested
% = percent by volume results in the composite coming completely apart after just 3 hours. In pure water, there is no separation of the composites even after 20 hours.

Experiment 2: Determination of the Decrease in Composite Strength of the Film Layers (Table 2)

Strips of the multilayer composites 15 mm wide and 20 cm long are cut out of the packagings. The strips were placed in 100 ml of water, or in 100 ml water mixed with 1 ml of eugenol or trans-anethole, in a stirred apparatus consisting of a 250 ml multinecked flask with reflux condenser and boiled under reflux (p ~1 bar) for 3 h. After boiling, the strips were removed from the apparatus and the composite adhesion measured within 30 min. The composite adhesion of the film layers was determined using the Zwick 5 kN Allround table-top testing machine in accordance with DIN 55533-5 in a 180° peel test. The detached ends of 15 mm wide strips of the film composites are clamped in the fixing clamps of the Zwick testing machine. During the measurement, the test clamps are pulled apart at a rate of 100 mm/min. The reported values are the average values from five individual measurements.

TABLE 2

|  | Composite 1 | | Composite 2 |
| --- | --- | --- | --- |
| After 3 h | Al//PET | Al//PE | PET//PE |
| 100 ml water | 1.6 | F* | 2.2 |
| +1% eugenol | 0.7 | 1.0 | 0.4 |
| +1% trans-anethole | 0.4 | 0.6 | 0.5 |
| +0.33% eugenol + 0.33% trans-anethole + 0.33% methyl trans-cinnamate | 0.4 | 0.2 | / |
| +1% eugenol + 1% trans-anethole + 1% methyl trans-cinnamate | <0.1 | 0.6 | / |

% = percent by volume
*film composite could not be separated. Attempting this caused the film to immediately tear.

The weakening of the adhesive layer by the phenylpropanoids is clear. After treatment with the aqueous mixture, the composite strength of the multilayer composites is markedly lower than that of the multilayer composite treated only with water.

The invention claimed is:

1. A process for separating at least two layers of a multilayer composite that are bonded to one another over an area by at least one adhesion promoter or adhesive polymer, wherein the multilayer composite is treated with a separating medium comprising at least one essential oil selected from the group consisting of phenylpropanoids,
   wherein the at least one adhesion promoter or adhesive polymer is polyurethane-based.

2. The process of claim 1, wherein the separating medium comprises at least one essential oil selected from the group consisting of phenylpropanoids is present
   a) in the form of a single-phase mixture of the at least one essential oil with at least one other substance, or
   b) in the form of a multiphase composition of the at least one essential oil with at least one other substance.

3. The process of claim 2, wherein the separating medium comprises at least one essential oil selected from the group consisting of phenylpropanoids is present in the form of an aqueous emulsion of the at least one essential oil.

4. The process of claim 3, wherein the aqueous emulsion comprises ≥0.1% by volume of the at least one essential oil, based on the volume of water used.

5. The process of claim 3, wherein the aqueous emulsion comprises ≥0.5% by volume of the at least one essential oil, based on the volume of water used.

6. The process of claim 1, wherein surface-active substances are added to the separating medium.

7. The process of claim 1, wherein the at least two layers of the multilayer composite that are bonded together over the area comprise at least one material selected from the group consisting of polyethylene, polypropylene, polyester, polyamide, aluminum, paper, cardboard, and mixtures thereof.

8. The process of claim 1, wherein the multilayer composite is introduced into the separating medium, the separating medium is heated to boiling temperature before or after the introduction of the multilayer composite, and the multilayer composite is treated by refluxing the separating medium at a pressure greater than or equal to 1013 mPas.

9. The process of claim 1, the process comprising a continuous operation or a discontinuous operation.

10. The process of claim 1, wherein the multilayer composite is mechanically comminuted into multilayer particles before being introduced into the separating medium.

11. The process of claim 10, wherein the multilayer particles extend along axes that run parallel to cover surfaces of the multilayer particles by an average, for all multilayer particles, of ≤400 mm2, wherein the cover surfaces of the multilayer particles refer to surfaces of a top layer and bottom layer of the multilayer particle that both face away from other layers of the multilayer particle.

12. The process of claim 10, wherein after the treatment with the separating medium, layers of the multilayer particles that are still adhering to one another are mechanically separated from one another.

13. The process of claim 12, wherein after the treatment with the separating medium and the mechanical separation of layers of the multilayer particles that are still adhering to one another, the separating medium is separated from the separated layers of the multilayer particles.

14. The process of claim 12, wherein a mixture of particle layers obtained after separation of the separating medium is separated according to particle material.

15. The process of claim 10, wherein after the treatment with the separating medium, the separating medium is separated from the separated layers of the multilayer particles.

* * * * *